US012568459B2

(12) United States Patent
Qiu et al.

(10) Patent No.: US 12,568,459 B2
(45) Date of Patent: Mar. 3, 2026

(54) POSITIONING METHOD AND COMMUNICATION APPARATUS

(71) Applicant: HUAWEI TECHNOLOGIES CO., LTD., Guangdong (CN)

(72) Inventors: Jianjun Qiu, Dongguan (CN); Haichao Wen, Dongguan (CN); Lihong Jiang, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 498 days.

(21) Appl. No.: 18/322,841

(22) Filed: May 24, 2023

(65) Prior Publication Data

US 2023/0300780 A1    Sep. 21, 2023

Related U.S. Application Data

(63) Continuation of application No. PCT/CN2020/131220, filed on Nov. 24, 2020.

(51) Int. Cl.
*H04W 64/00* (2009.01)
*H04J 3/06* (2006.01)

(52) U.S. Cl.
CPC ........... *H04W 64/00* (2013.01); *H04J 3/0658* (2013.01)

(58) Field of Classification Search
CPC ......... H04W 72/0446; H04W 56/0045; H04W 24/08; H04W 36/08; H04W 36/04;
(Continued)

(56) References Cited

U.S. PATENT DOCUMENTS

2014/0029586 A1*  1/2014  Loehr ................... H04L 5/0055
                                                          370/336
2016/0214446 A1*  7/2016  Moiraghi ........... B60C 23/0479
                          (Continued)

FOREIGN PATENT DOCUMENTS

JP          2012154760 A      8/2012
JP          2020508596 A      3/2020
                          (Continued)

OTHER PUBLICATIONS

TruePosition, "TP for 36.305," 3GPP TSG-RAN WG3 #70, R3-103315, Jacksonville, Florida, Nov. 15-19, 2010, 8 pages.
(Continued)

*Primary Examiner* — Joseph Arevalo
(74) *Attorney, Agent, or Firm* — Fish & Richardson P.C.

(57) ABSTRACT

This application discloses positioning methods and communication apparatuses, and relates to the field of communication technologies. In one example, a method applied to a positioning terminal includes receiving a first message from a network device, wherein the first message comprises clock synchronization information and access network resource allocation information; sending access request information to the network device based on the first message; receiving positioning resource allocation information from the network device, wherein the positioning resource allocation information is determined after the network device receives the access request information sent by the positioning terminal and sends the access request information to a location management function (LMF); determining a positioning pulse based on the positioning resource allocation information; and sending the positioning pulse to one of three or more network devices in a range of a neighborhood of the positioning terminal.

17 Claims, 10 Drawing Sheets

(58) Field of Classification Search

CPC ......... H04W 56/0005; H04W 56/0065; H04W 72/21; H04W 72/23; H04W 88/085; H04W 88/12; H04W 16/14; H04W 4/02; H04W 4/029; H04W 4/14; H04W 52/0261; H04W 60/04; H04W 64/00; H04W 72/1215; H04W 74/0833; H04W 74/0838; H04W 76/27; H04W 84/045; H04W 88/06; H04L 5/0048; H04L 5/001; H04L 5/0057; H04L 5/1469; H04L 1/1812; H04L 5/0055; H04L 69/323; H04L 69/324; H04L 5/0053; H04L 5/0069; H04L 5/0082; H04L 5/0091

USPC ........................ 455/456.1, 456.2, 418, 456.3

See application file for complete search history.

(56) References Cited

U.S. PATENT DOCUMENTS

| | | | | |
|---|---|---|---|---|
| 2017/0164258 | A1* | 6/2017 | Luo ....................... | H04W 36/22 |
| 2020/0028648 | A1 | 1/2020 | Akkarakaran et al. | |
| 2022/0053403 | A1* | 2/2022 | You ....................... | H04W 72/51 |
| 2022/0150866 | A1* | 5/2022 | Ren ....................... | H04B 7/0617 |
| 2022/0394655 | A1* | 12/2022 | Shreevastav ............ | H04W 4/12 |
| 2024/0319314 | A1* | 9/2024 | Lou ....................... | G01S 19/396 |
| 2024/0393473 | A1* | 11/2024 | Andrés Maldonado ..................... | |
| | | | | H04W 56/001 |
| 2025/0142523 | A1* | 5/2025 | Choi ..................... | H04W 48/20 |
| 2025/0184689 | A1* | 6/2025 | Ramachandran ..... | G01S 13/765 |

FOREIGN PATENT DOCUMENTS

| | | |
|---|---|---|
| WO | 2020006769 A1 | 1/2020 |
| WO | 2020146739 A1 | 7/2020 |
| WO | 2020197829 A1 | 10/2020 |

OTHER PUBLICATIONS

Office Action in Japanese Appln. No. 2023-531100, mailed on Jul. 1, 2024, 11 pages (with English translation).

3GPP TS 38.455 V16.1.0, "3rd Generation Partnership Project; Technical Specification Group Radio Access Network; NG-RAN; NR Positioning Protocol A (NRPPa) (Release 16)," Sep. 2020, 147 pages.

Qualcomm Incorporated, "NR Positioning Latency Analysis and Enhancements," 3GPP TSG-RAN WG2 Meeting #112-e, R2-2010096, Electronic, Nov. 2-13, 2020, 29 pages.

Office Action in Indian Appln. No. 202337035681, mailed on Mar. 19, 2024, 7 pages (with English translation).

* cited by examiner

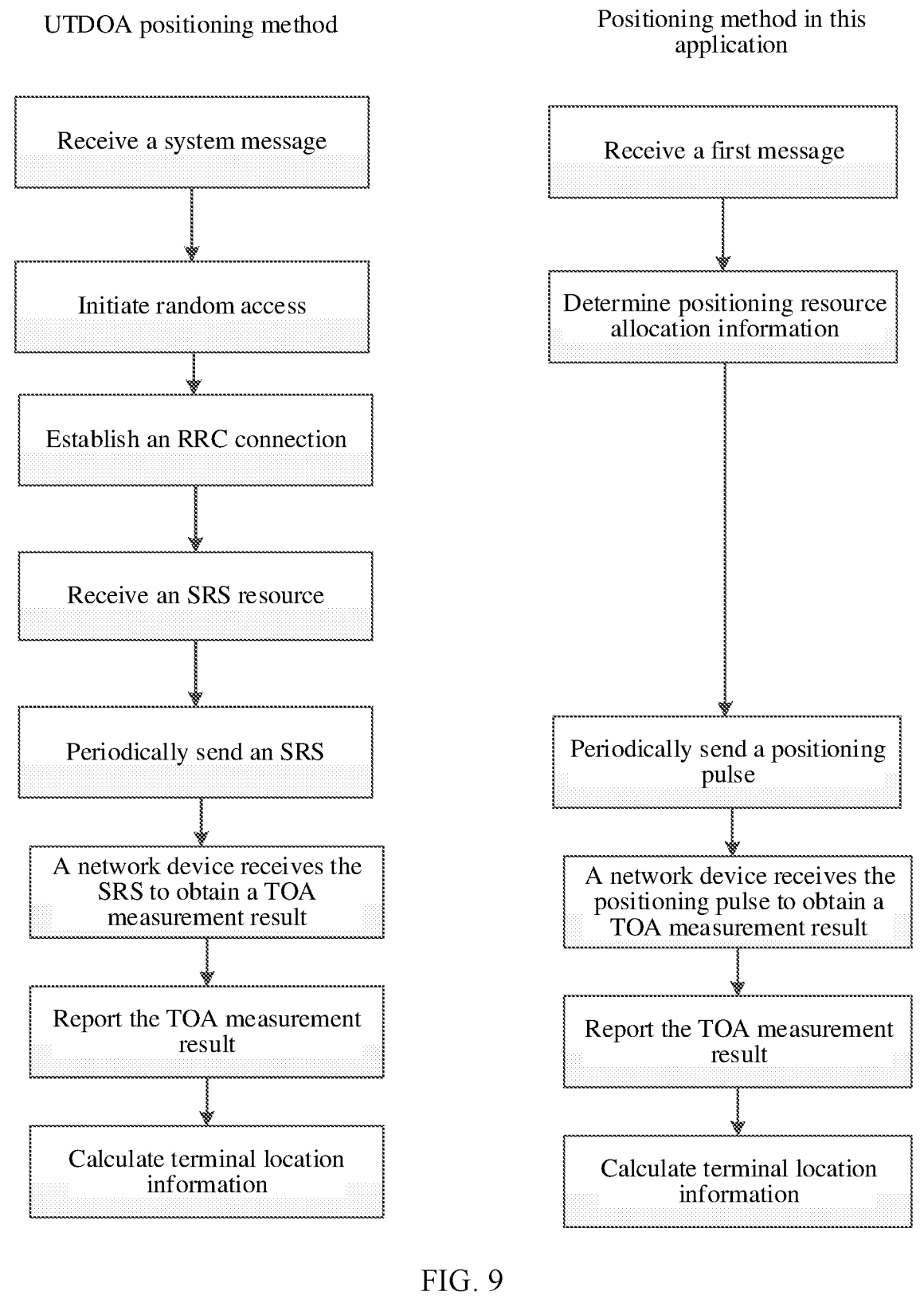

UTDOA positioning method

Positioning method in this application

Receive a system message

Initiate random access

Establish an RRC connection

Receive an SRS resource

Periodically send an SRS

A network device receives the SRS to obtain a TOA measurement result

Report the TOA measurement result

Calculate terminal location information

Receive a first message

Determine positioning resource allocation information

Periodically send a positioning pulse

A network device receives the positioning pulse to obtain a TOA measurement result Report the TOA measurement result Calculate terminal location information

FIG. 9

POSITIONING METHOD AND COMMUNICATION APPARATUS

CROSS-REFERENCE TO RELATED APPLICATIONS

This application is a continuation of International Application No. PCT/CN2020/131220, filed on Nov. 24, 2020, the disclosure of which is hereby incorporated by reference in its entirety.

TECHNICAL FIELD

This application relates to the field of communication technologies, and in particular, to a positioning method and a communication apparatus.

BACKGROUND

With development of 5th generation (5G) technologies, a high-precision positioning requirement is raised in an increasing quantity of fields. For example, there are a large quantity of devices in an industrial park, and determining a location of each device helps more properly configure resources of the park.

Positioning a terminal device based on positioning methods such as an uplink time difference of arrival (UTDOA) and an observed time difference of arrival (OTDOA) in the 5G-3rd generation partnership project (3GPP) standard can meet a high-precision positioning requirement. However, in a positioning process, the terminal device needs to maintain a radio resource control (RRC) connection to a network device in real time. Consequently, power consumption of the terminal device is high.

SUMMARY

This application provides a positioning method and a communication apparatus, to ensure positioning precision of a device and reduce power consumption of the device.

According to a first aspect, an embodiment of this application provides a positioning method. In the positioning method, a positioning terminal, at least three network devices (for example, a first network device, a second network device, and a third network device), and a location management function (LMF) need to interact with each other to implement positioning of the positioning terminal.

It is assumed that any network device sends a first message to the positioning terminal. In this case, the positioning terminal receives the first message from the network device. The first message includes clock synchronization information and access network resource allocation information. Then, the positioning terminal sends access request information to the network device based on the first message. The network device receives first request information, and sends the access request information to the LMF. The LMF determines, based on the access request information, positioning resource allocation information needed for the positioning terminal, and sends the positioning resource allocation information to the network device. The network device sends the positioning resource allocation information to the positioning terminal, to enable the positioning terminal to receive the positioning resource allocation information from the network device. The positioning terminal determines a positioning pulse based on the positioning resource allocation information, and sends the positioning pulse to a network device (for example, the first network device, the second network device, and the third network device) in a range of a neighborhood of the positioning terminal, to enable the network device in range of the neighborhood of the positioning terminal to obtain time of arrival (TOA) and sends the TOA to the LMF, where there are three or more network devices in the range of the neighborhood of the positioning terminal. The LMF determines location information of the positioning terminal based on the TOA.

It should be noted that, after the positioning terminal obtains the clock synchronization information, time synchronization between the positioning terminal and the network device can be ensured, so that when a positioning service is executed, the LMF can determine location information of the positioning terminal at different moments. After obtaining the access network resource allocation information, the positioning terminal may determine a manner of accessing a network. After accessing the network, the positioning terminal may obtain resource information of a related service. For example, for the positioning service in this application, the positioning terminal may obtain the positioning resource allocation information after accessing the network.

Compared with a conventional technology, in this positioning manner of the positioning terminal, an RRC connection is not needed, information exchanged between the positioning terminal and the LMF is reduced. This can reduce a power consumption loss of the positioning terminal. In addition, the positioning pulse of the positioning terminal is periodically sent, and the positioning terminal enters a dormant state after the positioning pulse is sent. This can further reduce the power consumption loss of the positioning terminal.

In an optional implementation, the first message further includes session reconfiguration flag information, and the session reconfiguration flag information is used to resend the access request information when the positioning resource allocation information changes.

It should be noted that, because a positioning symbol resource changes, the positioning terminal needs to reestablish a session. Therefore, the first message further includes the session reconfiguration flag information, so that the positioning terminal resends the access request information when the positioning resource allocation information changes.

In an optional implementation, the access network resource allocation information includes: an access location number, an access periodicity, and an access location interval periodicity. The access location number indicates a symbol resource used by the positioning terminal to access a network. The access periodicity indicates interval time needed for the positioning terminal to reaccess the network after the positioning terminal fails to access the network. The access location interval periodicity indicates an interval periodicity in which the positioning terminal performs access at different access location numbers.

The access location number indicates the symbol resource used by the positioning terminal to access the network, in other words, an access symbol location used when the positioning terminal initially initiates an access request. For example, the access location number includes a plurality of access symbol locations. The positioning terminal may select one access symbol location to send the access request information to the network device. If determining that the positioning terminal accesses the network at an access symbol provided by the access location number, the network device transmits service information with the positioning terminal.

The access periodicity indicates the interval time needed for the positioning terminal to reaccess the network after the positioning terminal fails to access the network. It should be noted that, the access symbol locations may be limited. However, at the same time, a plurality of positioning terminals may need to access the network, and access location numbers obtained by the plurality of positioning terminals may be the same. In this case, a positioning terminal may fail to access the network. After failing to access the network, the positioning terminal performs access again based on the access periodicity. For example, a setting rule of an access periodicity setting is that a value of the access periodicity increases exponentially as a quantity of access failures increases. After failing to access the network for the first time, the positioning terminal reinitiates the access request information two seconds later, and after failing to access the network for the second time, reinitiates the access request information four seconds later. In addition, the setting rule of the access periodicity is not specifically limited herein, and the access periodicity may be set based on a fixed value. This is not specifically limited in this application. The positioning terminal reaccesses the network at an interval of the access periodicity after the access fails. In an aspect, power consumption waste caused by continuous tries to access the network can be avoided. In another aspect, a quantity of network access conflicts with another positioning terminal can be reduced.

The access location interval periodicity indicates an interval periodicity in which the positioning terminal performs access at different access location numbers. It should be noted that an access symbol location of a same access location number is limited, and a new access symbol location at which the access may be initiated is determined based on the access location interval periodicity. An optional access symbol location may be added when the positioning terminal accesses the network. For example, it is determined, based on the access location number, that the access symbol location at which the access may be initiated is a location 1. When the access location interval periodicity is 5, a location 6 may be determined at an interval of five locations, and the positioning terminal may initiate the access request information at the location 6.

It should be noted that, the positioning terminal may randomly select an initial access symbol resource and send the initial access request information, to avoid a conflict occurred when the positioning terminal accesses the network. At the same time, the positioning terminal starts a timer to wait for the positioning resource allocation information. If still not obtaining the positioning resource allocation information when the timer expires, the positioning terminal reinitiates the access request information with reference to configuration information of the access periodicity.

In an optional implementation, the positioning resource allocation information carries a positioning symbol resource allocated by the LMF to the positioning terminal, and the positioning symbol resource includes a positioning symbol location number and a positioning pulse sending periodicity. The positioning symbol location number indicates a resource location at which the positioning terminal sends the positioning pulse. The positioning pulse sending periodicity indicates a periodicity in which the positioning terminal sends the positioning pulse.

In an optional implementation, after determining the positioning pulse based on the positioning resource allocation information, the positioning terminal starts a timer, and sends the positioning pulse based on the positioning pulse sending periodicity.

It should be noted that, after obtaining the positioning resource allocation information, the positioning terminal may start the timer, and send the positioning pulse based on the positioning pulse sending periodicity, so that the LMF can periodically determine location information of the positioning terminal.

In an optional implementation, the positioning terminal determines a time interval between receiving the first message and sends the positioning pulse. If the time interval is greater than a preset time threshold, the positioning terminal enters a dormant state. If the time interval is less than or equal to a preset time threshold, the positioning terminal sends the positioning pulse.

In an optional implementation, the positioning terminal needs to re-receive the positioning resource allocation information in the following cases: The positioning terminal initially accesses the network; and the positioning terminal moves to a management area of an LMF other than a management area of the LMF.

In an optional implementation, after sending the positioning resource allocation information to the network device, the LMF sets the positioning symbol resource to be in an allocated state.

It should be noted that, after allocating the positioning resource allocation information to the positioning terminal, the LMF sets the positioning symbol resource in the positioning resource allocation information to be in the allocated state, to avoid that another positioning terminal occupies the positioning symbol resource.

In an optional implementation, after sending the positioning resource allocation information to the network device, the LMF starts a timer. If TOA sent by the network device in a range of a neighborhood of the positioning terminal is not received when the timer expires, the LMF releases the positioning symbol resource.

It should be noted that, after setting the positioning symbol resource to be in the allocated state, the LMF starts the timer to wait for a TOA measurement result related to the positioning terminal. If the TOA measurement result related to the positioning terminal is still not received when the timer expires (to be specific, if the LMF still does not receive the TOA measurement result when the timer expires, it is considered that the positioning terminal does not send the positioning pulse under the positioning symbol resource, or the positioning symbol resource is unavailable), the LMF releases the positioning symbol resource.

According to a second aspect, an embodiment of this application provides a communication apparatus, including a transceiver unit and a processing unit. The transceiver unit is configured to: receive a first message from a network device, where the first message includes clock synchronization information and access network resource allocation information; send access request information to the network device based on the first message; and receive positioning resource allocation information from the network device, where the positioning resource allocation information is determined after the network device receives the access request information sent by a positioning terminal and sends the access request information to a location management function LMF. The processing unit is configured to: determine a positioning pulse based on the positioning resource allocation information; and send the positioning pulse to a network device in a range of a neighborhood of the positioning terminal, where there are three or more network devices in the range of the neighborhood of the positioning terminal.

In an optional implementation, the first message further includes session reconfiguration flag information, and the session reconfiguration flag information is used to resend the access request information when the positioning resource allocation information changes.

In an optional implementation, the access network resource allocation information includes: an access location number, an access periodicity, and an access location interval periodicity. The access location number indicates a symbol resource used by the positioning terminal to access a network. The access periodicity indicates interval time needed for the positioning terminal to reaccess the network after the positioning terminal fails to access the network. The access location interval periodicity indicates an interval periodicity in which the positioning terminal performs access at different access location numbers.

In an optional implementation, the positioning resource allocation information carries a positioning symbol resource allocated by the LMF to the positioning terminal, and the positioning symbol resource includes a positioning symbol location number and a positioning pulse sending periodicity. The positioning symbol location number indicates a resource location at which the positioning terminal sends the positioning pulse. The positioning pulse sending periodicity indicates a periodicity in which the positioning terminal sends the positioning pulse.

In an optional implementation, the processing unit is further configured to send the positioning pulse based on the positioning pulse sending periodicity.

In an optional implementation, the processing unit is further configured to: determine a time interval between receiving the first message and send the positioning pulse. If the time interval is greater than a preset time threshold, the positioning terminal enters a dormant state. If the time interval is less than or equal to a preset time threshold, the positioning terminal sends the positioning pulse.

In an optional implementation, the positioning terminal needs to re-receive the positioning resource allocation information in the following cases: The positioning terminal initially accesses the network; and the positioning terminal moves to a management area of an LMF other than a management area of the LMF.

According to a third aspect, an embodiment of this application provides a communication apparatus, including a transceiver unit and a processing unit. The transceiver unit is configured to receive access request information from a network device. The access request information is sent by a positioning terminal after the positioning terminal receives a first message from the network device. The first message includes clock synchronization information and access network resource allocation information. The processing unit is configured to: determine, based on the access request information, positioning resource allocation information needed for the positioning terminal; send the positioning resource allocation information to the network device, to enable the network device to send the positioning resource allocation information to the positioning terminal, so that after the positioning terminal determines a positioning pulse based on the positioning resource allocation information, the positioning terminal sends the positioning pulse to a network device in a range of a neighborhood of the positioning terminal, where there are three or more network devices in the range of the neighborhood of the positioning terminal;

receive time of arrival TOA sent by the network device in the range of the neighborhood of the positioning terminal, where the TOA is determined after the network device in the range of the neighborhood of the positioning terminal receives the positioning pulse; and determine location information of the positioning terminal based on the TOA.

In an optional implementation, the positioning resource allocation information carries a positioning symbol resource allocated by the LMF to the positioning terminal, and the positioning symbol resource includes a positioning symbol location number and a positioning pulse sending periodicity. The positioning symbol location number indicates a resource location at which the positioning terminal sends the positioning pulse. The positioning pulse sending periodicity indicates a periodicity in which the positioning terminal sends the positioning pulse.

In an optional implementation, the processing unit is further configured to set the positioning symbol resource to be in an allocated state.

In an optional implementation, the processing unit is further configured to: start a timer; and if the TOA sent by the network device in the range of the neighborhood of the positioning terminal is not received when the timer expires, release the positioning symbol resource.

In an optional implementation, the first message further includes session reconfiguration flag information, and the session reconfiguration flag information is used to resend the access request information when the positioning resource allocation information changes.

In an optional implementation, the access network resource allocation information includes: an access location number, an access periodicity, and an access location interval periodicity. The access location number indicates a symbol resource used by the positioning terminal to access a network. The access periodicity indicates interval time needed for the positioning terminal to reaccess the network after the positioning terminal fails to access the network. The access location interval periodicity indicates an interval periodicity in which the positioning terminal performs access at different access location numbers.

According to a fourth aspect, an embodiment of this application provides a communication apparatus, including a transceiver unit and a processing unit. The transceiver unit is configured to send a first message to a positioning terminal, where the first message includes clock synchronization information and access network resource allocation information; and receive access request information sent by the positioning terminal after the positioning terminal receives the first message. The processing unit is configured to: send the access request information to a location management function LMF, to enable the LMF to feed back positioning resource allocation information; and send the positioning resource allocation information to the positioning terminal, to enable the positioning terminal to determine a positioning pulse based on the positioning resource allocation information.

In an optional implementation, the first message further includes session reconfiguration flag information, and the session reconfiguration flag information is used to resend the access request information when the positioning resource allocation information changes.

In an optional implementation, the access network resource allocation information includes: an access location number, an access periodicity, and an access location interval periodicity. The access location number indicates a symbol resource used by the positioning terminal to access a network. The access periodicity indicates interval time needed for the positioning terminal to reaccess the network after the positioning terminal fails to access the network. The access location interval periodicity indicates an interval periodicity in which the positioning terminal performs access at different access location numbers.

In an optional implementation, the positioning resource allocation information carries a positioning symbol resource allocated by the LMF to the positioning terminal, and the positioning symbol resource includes a positioning symbol location number and a positioning pulse sending periodicity. The positioning symbol location number indicates a resource location at which the positioning terminal sends the positioning pulse. The positioning pulse sending periodicity indicates a periodicity in which the positioning terminal sends the positioning pulse.

According to a fifth aspect, this application provides a communication apparatus, including a processor and a memory. The memory is configured to store a computer program. When the apparatus runs, the processor executes the computer program stored in the memory, so that the communication apparatus performs the method according to any one of the first aspect or embodiments of the first aspect.

According to a sixth aspect, an embodiment of this application further provides a computer-readable storage medium, including instructions. When the instructions are run on a computer, the computer is enabled to perform the method according to any one of the first aspect or the possible designs of the first aspect.

According to a seventh aspect, this application provides a computer program product, including instructions. When the instructions are run on a computer, the computer is enabled to perform the method according to any one of the first aspect or embodiments of the first aspect.

According to an eighth aspect, an embodiment of this application provides a chip system. The chip system includes a processor, and may further include a memory, configured to implement the method according to any one of the first aspect or the possible designs of the first aspect. The chip system may include a chip, or may include a chip and another discrete component.

According to a ninth aspect, an embodiment of this application provides a communication system. The system includes a positioning terminal, a network device, and an LMF. The communication system is configured to perform the method according to any one of the first aspect or the possible designs of the first aspect.

For technical effects that can be achieved in the second aspect to the ninth aspect, refer to descriptions of technical effects that can be achieved in the corresponding possible design solutions in the first aspect. Details are not described herein in this application.

BRIEF DESCRIPTION OF DRAWINGS

FIG. 9 is a schematic diagram of comparison between a positioning method according to an embodiment of this application and a UTDOA positioning method;

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In descriptions of this application, unless otherwise specified, "a plurality of" means two or more than two.

Figures 1, 2:
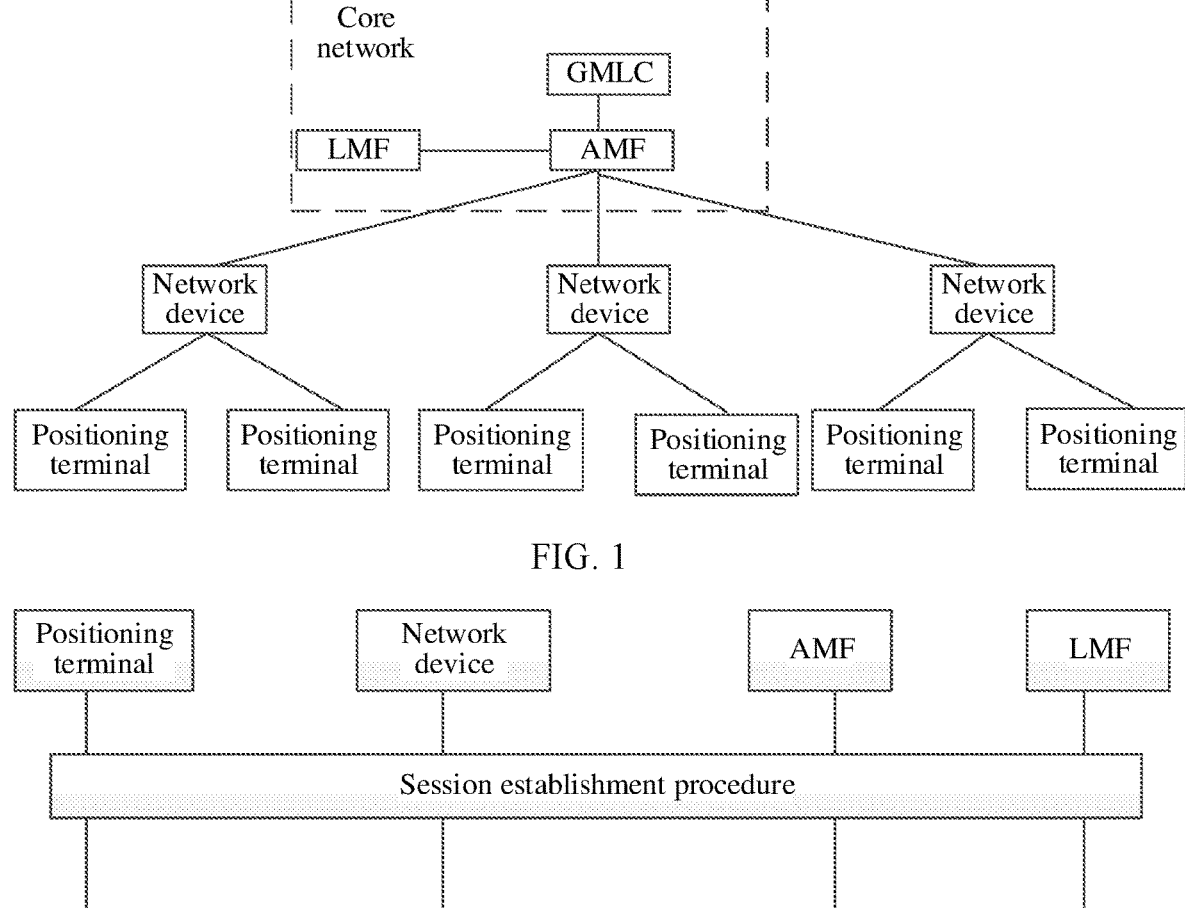
FIG. 1 is a schematic diagram of a system architecture according to an embodiment of this application.
FIG. 2 is a schematic flowchart of performing a positioning method according to an embodiment of this application.

FIG. 1 is a schematic diagram of an architecture of a communication system that may be used in a positioning scenario according to this application. The system architecture includes a core network, a plurality of network devices, and a plurality of positioning terminals. Functions of a core network in this application include: a gateway mobile location center (GMLC), an LMF, and an access and mobility management function (AMF).

It should be noted that a positioning terminal mentioned in this application may be a positioning tag, a positioning band, or an intelligent device that can be attached to an object that needs to be positioned. The positioning terminal does not support paging, is not woken up by a network device, and has characteristics of portability and high mobility. The positioning terminal may support only a positioning service to reduce energy consumption. However, during actual application, a specific service supported by the positioning terminal is not specifically limited. In addition, the positioning terminal may be used together with another object. For example, the positioning terminal may be attached to a loading machine in a port, the positioning terminal may be attached to anti-corrosion clothes of a worker in a chemical plant, or the positioning terminal may be attached to a mobile terminal device (a mobile phone, a computer, or the like). A form in which the positioning terminal is used together with another object is not specifically limited in this application.

For example, the network device may provide an access service for the positioning terminal. The network device may include a base station (BS), or include a base station, a radio resource management device for controlling the base station, and the like. The base station herein may be a relay station, an access point, a base station in a 5G network, a base station in a future evolved public land mobile network (PLMN) network, for example, an NR base station. This is not limited in embodiments of this application.

For example, the GMLC, the LMF, and the AMF may be 3GPP standard functions, or may be simplified versions of 3GPP standard functions that only need to support a low-power positioning requirement. The AMF may be connected to the network device or the LMF, and may forward positioning-related information to the network device or the LMF. The LMF may be configured to allocate a resource needed for the positioning service of the positioning terminal, and may further be configured to calculate a location of the positioning terminal, to determine location information of the positioning terminal. The GMLC may feed back the location information of the positioning terminal to a relevant software application, so that the relevant software application displays the location information of the positioning terminal or uses the location information of the positioning terminal to perform other service processing.

In addition, it should be further noted that, when performing the positioning service, the positioning terminal in this application needs to send a positioning pulse to the network device. After receiving the positioning pulse, the network device obtains TOA, and feeds back a TOA measurement report to the LMF. The LMF determines a distance between the positioning terminal and the network device based on the TOA measurement report. However, a location of the positioning terminal cannot be determined based on the TOA measurement report fed back by one network device. At least three network devices need to feed back the TOA measurement reports, so that the LMF can accurately obtain location information of the positioning terminal. Therefore, there are three or more network devices mentioned in this application. Details are not described below again.

The positioning terminal needs to establish a session with the LMF to implement a positioning method in this application. After the session is established, the LMF allocates a positioning resource to the positioning terminal. The positioning terminal sends the positioning pulse to the network device based on the positioning resource. The network device feeds back the TOA of the positioning pulse to the LMF, to enable the LMF to obtain the location information of the positioning terminal based on the TOA. FIG. 2 shows that a positioning service procedure can be executed only after a positioning terminal and an LMF execute a session establishment procedure. The positioning terminal enters a dormant state after executing a positioning service once, and executes the positioning service procedure only after being woken up again. That the positioning terminal enters the dormant state after executing the positioning service once, and is woken up until the positioning service needs to be executed next time can reduce a power consumption loss of the positioning terminal.

Figure 3:
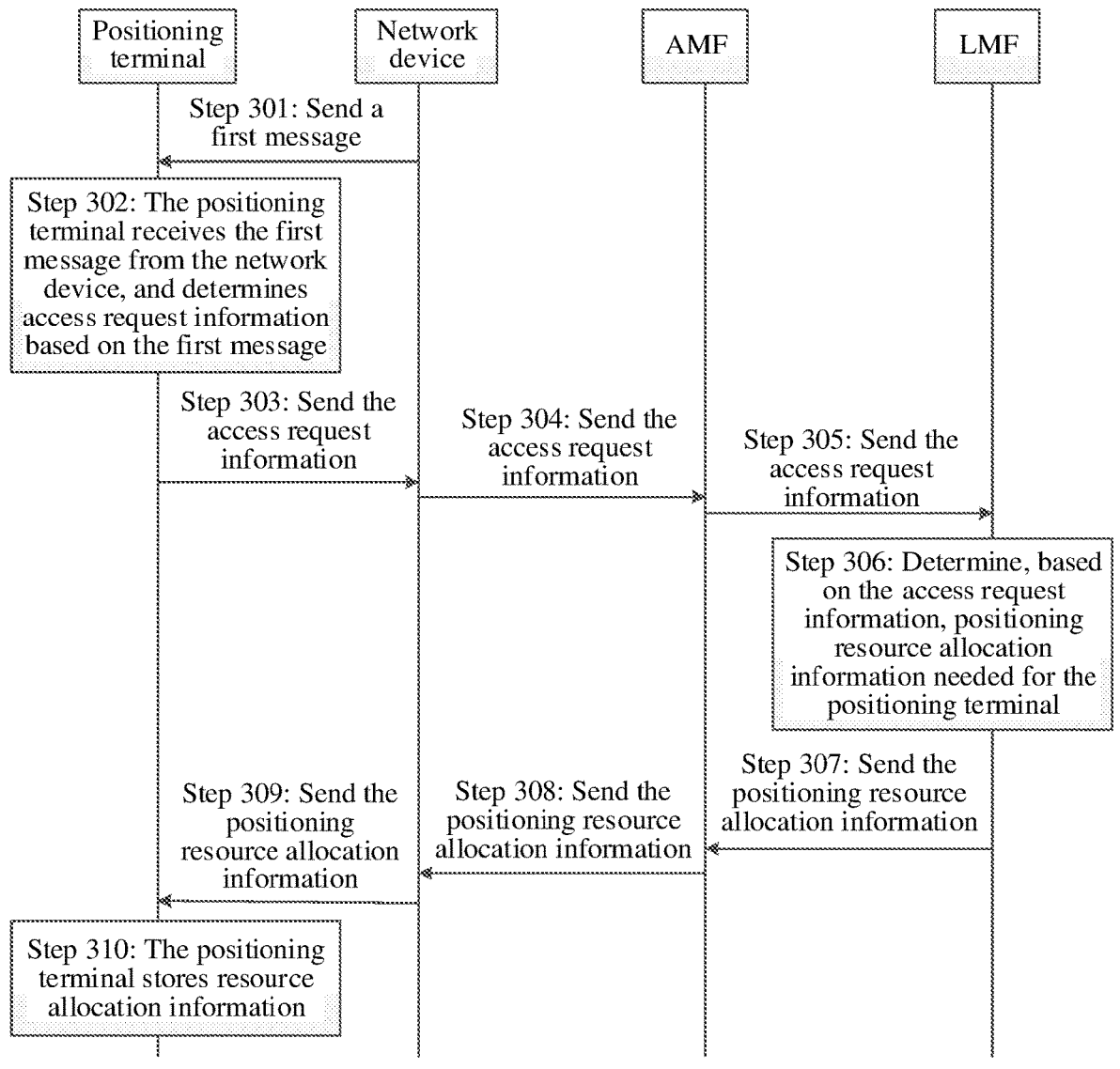
FIG. 3 is a schematic flowchart of a session establishment method according to an embodiment of this application.

FIG. 3 is a schematic flowchart of session establishment according to an embodiment of this application. The session establishment needs to be implemented by exchanging information between a positioning terminal, a network device, and an LMF. During actual application, the network device needs to forward a message to the LMF via an AMF. Therefore, the LMF is further shown in the figure. When the session is established, the following steps may be performed.

Step 301: The network device sends a first message to the positioning terminal. The first message includes clock synchronization information and access network resource allocation information.

Step 302: The positioning terminal receives the first message from the network device, and determines access request information based on the first message.

It should be noted that, after the positioning terminal obtains the clock synchronization information, time synchronization between the positioning terminal and the network device can be ensured, so that when a positioning service is executed, the LMF can determine location information of the positioning terminal at different moments. After obtaining the access network resource allocation information, the positioning terminal may determine a manner of accessing a network. After accessing the network, the positioning terminal may obtain resource information of a related service. For example, for the positioning service in this application, the positioning terminal may obtain positioning resource allocation information after accessing the network.

For example, the access network resource allocation information includes an access location number (access symbol identity document), an access periodicity (initial access period), and an access location interval periodicity (access resource cycle).

The access location number indicates a symbol resource used by the positioning terminal to access the network, in other words, an access symbol location used when the positioning terminal initially initiates an access request. For example, the access location number includes a plurality of access symbol locations. The positioning terminal may select one access symbol location to send the access request information to the network device. If determining that the positioning terminal accesses the network at an access symbol provided by the access location number, the network device transmits service information with the positioning terminal.

The access periodicity indicates interval time needed for the positioning terminal to reaccess the network after the positioning terminal fails to access the network. It should be noted that, the access symbol locations may be limited. However, at the same time, a plurality of positioning terminals may need to access the network, and access location numbers obtained by the plurality of positioning terminals may be the same. In this case, a positioning terminal may fail to access the network. After failing to access the network, the positioning terminal performs access again based on the access periodicity. For example, a setting rule of an access periodicity setting is that a value of the access periodicity increases exponentially as a quantity of access failures increases. After failing to access the network for the first time, the positioning terminal reinitiates the access request information two seconds later, and after failing to access the network for the second time, reinitiates the access request information four seconds later. In addition, the setting rule of the access periodicity is not specifically limited herein, and the access periodicity may be set based on a fixed value. This is not specifically limited in this application. The positioning terminal reaccesses the network at an interval of the access periodicity after the access fails. In an aspect, power consumption waste caused by continuous tries to access the network can be avoided. In another aspect, a quantity of network access conflicts with another positioning terminal can be reduced.

The access location interval periodicity indicates an interval periodicity in which the positioning terminal performs access at different access location numbers. It should be noted that an access symbol location of a same access location number is limited, and a new access symbol location at which the access may be initiated is determined based on the access location interval periodicity. An optional access symbol location may be added when the positioning terminal accesses the network. For example, it is determined, based on the access location number, that the access symbol location at which the access may be initiated is a location 1. When the access location interval periodicity is 5, a location 6 may be determined at an interval of five locations, and the positioning terminal may initiate the access request information at the location 6.

It should be noted that, the positioning terminal may randomly select an initial access symbol resource and send the initial access request information, to avoid a conflict occurred when the positioning terminal accesses the network. At the same time, the positioning terminal starts a timer to wait for the positioning resource allocation information. If still not obtaining the positioning resource allocation information when the timer expires, the positioning terminal reinitiates the access request information with reference to configuration information of the access periodicity.

Step 303: The positioning terminal sends the access request information to the network device.

Step 304: The network device forwards the access request information to the AMF.

Step 305: The AMF forwards the access request information to the LMF.

Step 306: The LMF determines, based on the access request information, positioning resource allocation information needed for the positioning terminal.

It should be noted that the LMF may determine positioning resource allocation information for a plurality of positioning terminals, and different positioning terminals correspond to different positioning resource allocation information. The positioning resource allocation information may carry a positioning symbol resource allocated by the LMF to the positioning terminal. The positioning symbol resource includes: a positioning symbol location number (resource symbol index), and a positioning pulse sending periodicity (resource duration). The positioning symbol location number indicates a resource location at which the positioning terminal sends a positioning pulse, in other words, a resource location allocated by the LMF at which the positioning pulse is sent. The positioning pulse sending periodicity indicates a periodicity in which the positioning terminal sends the positioning pulse.

Step 307: The LMF sends the positioning resource allocation information to the AMF.

Step 308: The AMF forwards the positioning resource allocation information to the network device.

Step 309: The network device forwards the positioning resource allocation information to the positioning terminal.

Step 310: The positioning terminal stores resource allocation information.

It should be noted that, because a positioning symbol resource changes, the positioning terminal needs to reestablish a session. Therefore, the first message further includes the session reconfiguration flag information, so that the positioning terminal resends the access request information when the positioning resource allocation information changes.

In addition, it should be further noted that the positioning terminal needs to reobtain the positioning resource allocation information in one or more of the following cases:

Case 1: After being powered on and registered with the network, the positioning terminal initially accesses the network, and needs to initiate a session establishment procedure to obtain positioning resource allocation information needed for the positioning service.

Case 2: When moving to a management area of an LMF other than a management area of the LMF, the positioning terminal needs to reinitiate a session establishment procedure, and reobtain positioning resource allocation information needed for the positioning service. For example, the positioning terminal establishes a session connection to a first LMF and obtains positioning resource allocation information, and the positioning terminal moves to an area managed by a second LMF. In this case, a session connection to the second LMF needs to be reestablished.

Case 3: When leaving a management area of the LMF for a long time and re-enters the network, the positioning terminal needs to reinitiate a session establishment procedure to reobtain positioning resource allocation information needed for the positioning service. For example, the positioning terminal establishes a session connection to a first LMF, and obtains positioning resource allocation information allocated by the first LMF to the positioning terminal. Then, after leaving a management area of the first LMF for a period of time, the positioning terminal returns to the management area of the first LMF again. In this case, the positioning terminal needs to reestablish a session with the first LMF to determine the positioning resource allocation information.

In the session establishment solution between the positioning terminal and the LMF provided in this embodiment of this application, there is little information exchanged between the positioning terminal and the LMF. The positioning terminal only needs to obtain the first message, initiates the access request information based on the first message, and then obtains the positioning resource allocation information determined by the LMF for the positioning terminal. Compared with session establishment in a conventional technology in which an RRC connection needs to be established and sounding reference signal (SRS) resource allocation needs to be waited, a quantity of times for exchanging information is significantly reduced. When the quantity of times for exchanging information of the positioning terminal is reduced, working duration of the positioning terminal is short. Therefore, a power consumption loss of the positioning terminal is reduced.

Figure 4:
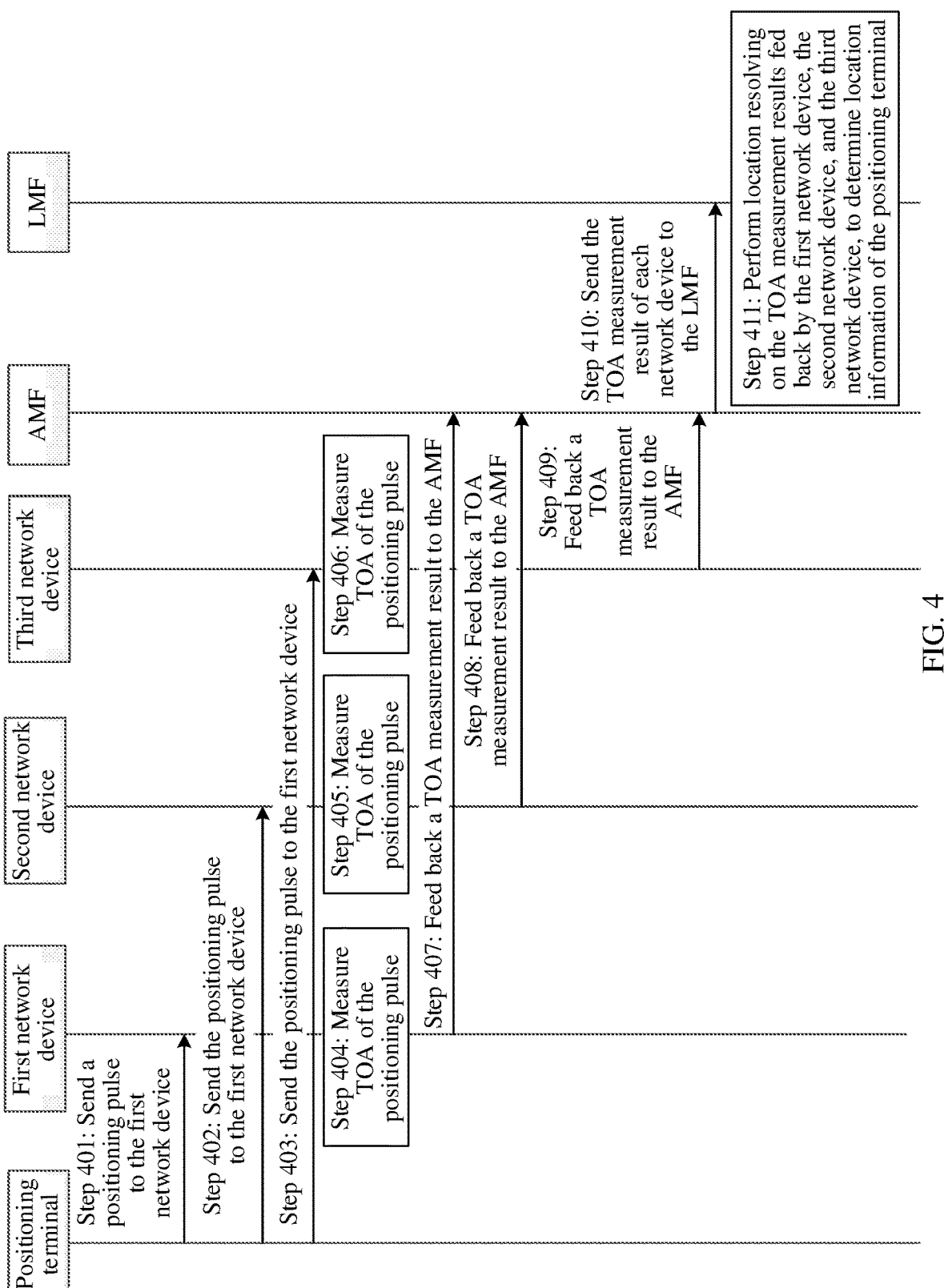
FIG. 4 is a schematic flowchart of a positioning service according to an embodiment of this application.

FIG. 4 is a schematic flowchart of a positioning service according to an embodiment of this application. The positioning service needs to be implemented by exchanging information between a positioning terminal, a first network device, a second network device, a third network device, and an LMF. During actual application, the network device needs to forward a message to the LMF via an AMF. Therefore, the AMF is further shown in the figure. It should be noted that the first network device, the second network device, and the third network device are located in a range of a neighborhood of the positioning terminal. In other words, the positioning terminal may send data to a network device in the area, and the network device in the area may receive the data.

In FIG. 4, the first network device, the second network device, and the third network device are merely used as an example for illustration. However, during actual application, a quantity of network devices is not limited. Any one of the first network device, the second network device, and the third network device may be a network device that sends a first message to the positioning terminal, or may be a network device in the range of the neighborhood of the positioning terminal (a network device to which the positioning terminal may send information). The network device in the neighborhood of the positioning terminal may be a network device located near the positioning terminal, for example, a neighboring-cell base station of a base station that establishes a connection to the positioning terminal. When the positioning terminal is positioned, the following steps may be performed:

Step 401: The positioning terminal sends a positioning pulse to the first network device.

Step 402: The positioning terminal sends the positioning pulse to the second network device.

Step 403: The positioning terminal sends the positioning pulse to the third network device.

Step 404: The first network device measures TOA of the positioning pulse.

Step 405: The second network device measures TOA of the positioning pulse.

Step 406: The third network device measures TOA of the positioning pulse.

Step 407: The first network device feeds back a TOA measurement result to the AMF.

Step 408: The second network device feeds back a TOA measurement result to the AMF.

Step 409: The third network device feeds back a TOA measurement result to the AMF.

Step 410: The AMF sends the TOA measurement result of each network device to the LMF.

Step 411: The LMF performs location solving on the TOA measurement results fed back by the first network device, the second network device, and the third network device, to determine location information of the positioning terminal.

It should be noted that, a sequence of performing step 401 to step 403, a sequence of performing step 404 to step 406, and a sequence of performing step 407 to step 409 are not limited. In addition, it should be further noted that, after obtaining positioning resource allocation information, the positioning terminal may start a timer, and send the positioning pulse based on a positioning pulse sending periodicity, so that the LMF can periodically determine the location information of the positioning terminal.

In addition, it should be further noted that, after allocating the positioning resource allocation information to the positioning terminal, the LMF sets the positioning symbol resource in the positioning resource allocation information to be in an allocated state, to avoid that another positioning terminal occupies the positioning symbol resource. After setting the positioning symbol resource to be in the allocated state, the LMF starts the timer to wait for a TOA measurement result related to the positioning terminal. If the TOA measurement result related to the positioning terminal is still not received when the timer expires (to be specific, if the LMF still does not receive the TOA measurement result when the timer expires, it is considered that the positioning terminal does not send the positioning pulse under the positioning symbol resource, or the positioning symbol resource is unavailable), the LMF releases the positioning symbol resource.

Figure 5:
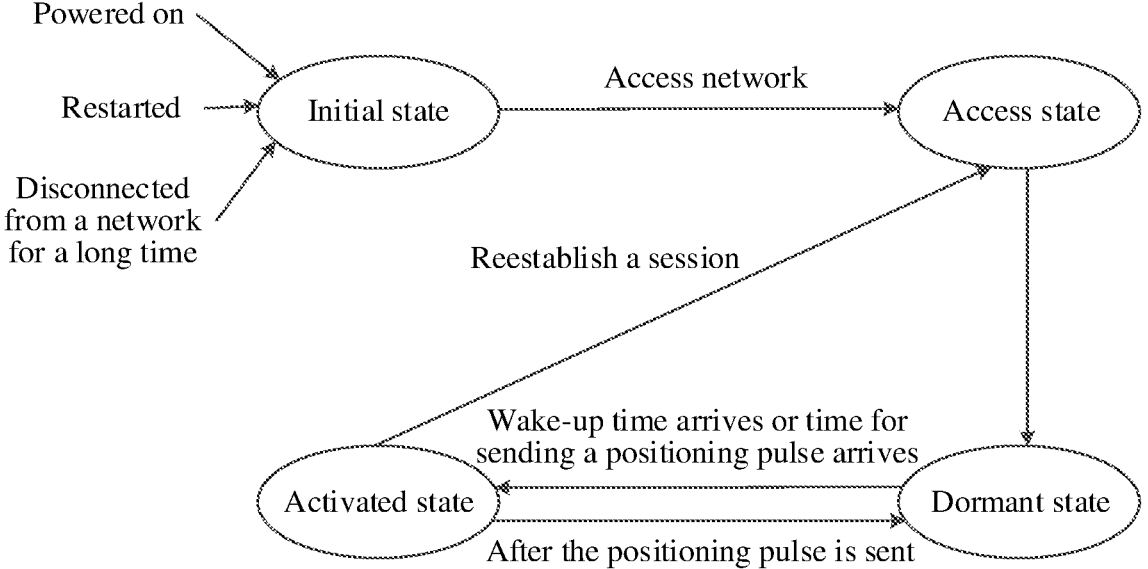
FIG. 5 is a schematic diagram of working states of a positioning terminal according to an embodiment of this application.

It should be noted that when performing the positioning method in this application, the positioning terminal mainly includes four working states: an initial state, an access state, an activated state, and a dormant state. The four working states may be mutually converted, as shown in FIG. 5. When being powered on, restarted, or disconnected from a network for a long time, the positioning terminal enters the initial state. In the initial state, the positioning terminal performs a network search, tries to capture a first message, and obtains a network parameter after reading the first message. If the search fails, the positioning terminal prolongs a retry periodicity and retries the network search to avoid excessive power consumption caused by long-time network search.

After obtaining a valid network parameter to access the network, the positioning terminal enters the access state from the initial state. In the access state, the positioning terminal sends an access request message, receives positioning resource allocation information sent by an LMF, calculates next wake-up time and time for sending a positioning pulse, and enters the dormant state. When the positioning terminal is in the dormant state, only a wake-up module is in a working state, and all other modules are turned off. When the wake-up time or the time for sending the positioning pulse arrives, the positioning terminal is activated by using the wake-up module, and enters the activated state.

If the positioning terminal enters the activated state when the wake-up time arrives, the positioning terminal first reads clock synchronization information in the first message, and determines, based on a system message, whether a session needs to be reestablished. If the session needs to be reestablished, the positioning terminal enters the access state. Otherwise, the positioning terminal calculates next wake-up time and next time for sending the positioning pulse, and enters the dormant state. If the positioning terminal is woken up when time for sending the positioning pulse arrives, the positioning terminal directly sends the positioning pulse on a positioning symbol resource, and enters the dormant state.

Figure 6:
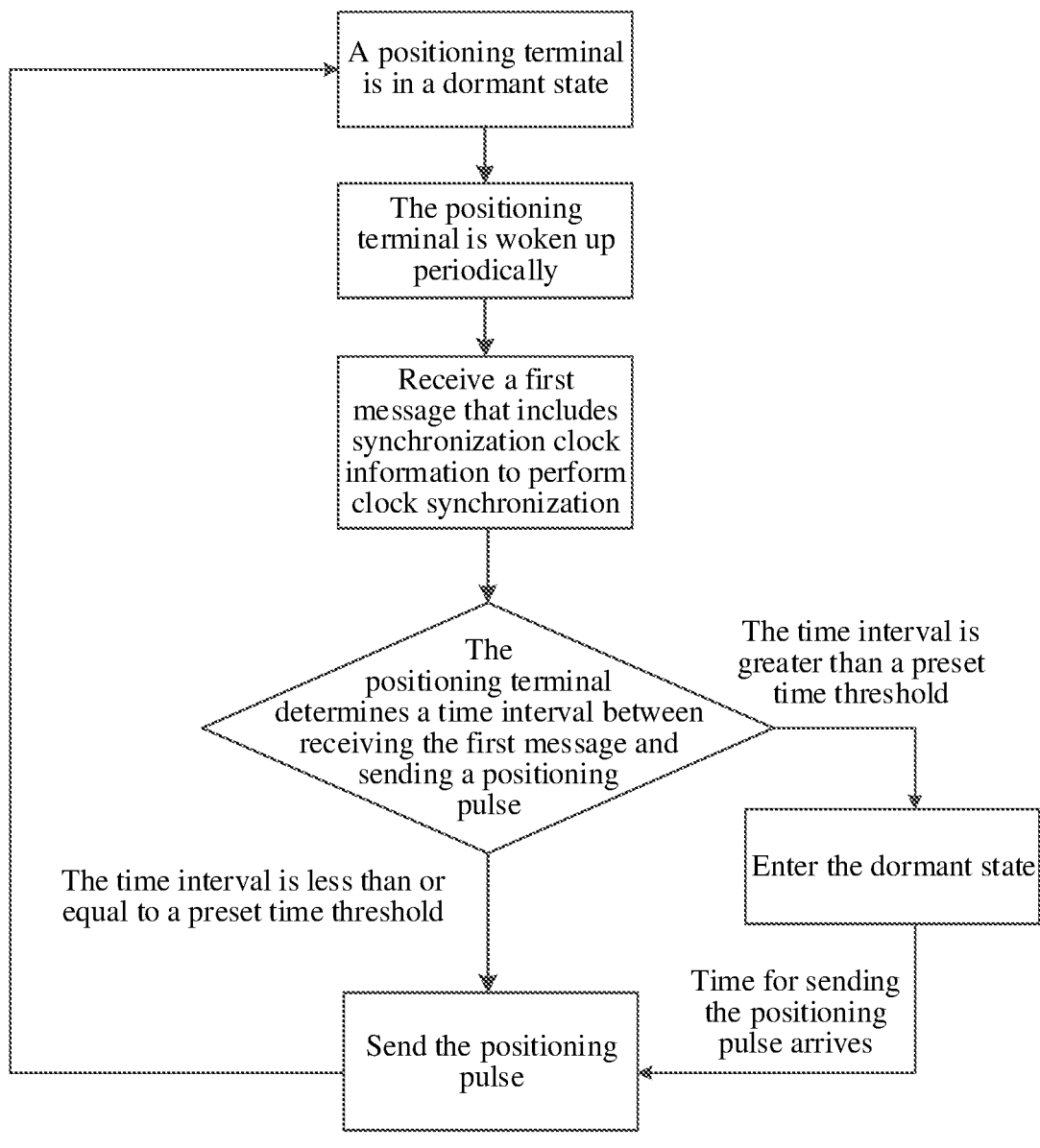
FIG. 6 is a schematic diagram of a working procedure of a positioning terminal according to an embodiment of this application.

A working procedure of the positioning terminal may be executed with reference to FIG. 6. When not executing a positioning service, the positioning terminal is in a dormant state, and is woken up periodically when wake-up time arrives, and receives a first message that includes synchronization clock information to perform clock synchronization. The positioning terminal determines a time interval between receiving the first message and sending a positioning pulse. If the time interval is greater than a preset time threshold, the positioning terminal first enters a dormant state, and is woken up when time for sending the positioning pulse arrives, and sends the positioning pulse. If the time interval is less than or equal to a preset time threshold, the positioning terminal directly sends the positioning pulse. The positioning terminal continues to enter the dormant state after sending the positioning pulse.

Figure 7A:
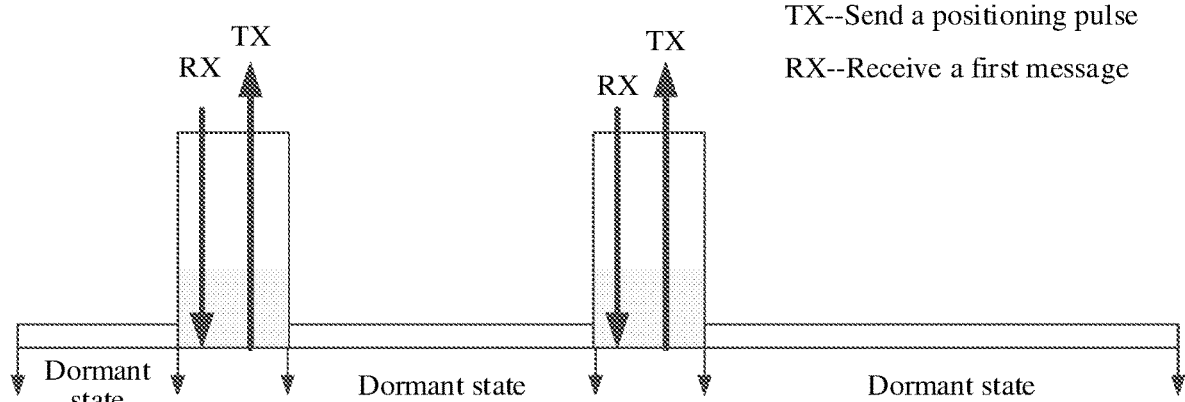
FIG. 7A is a working sequence diagram of a positioning terminal according to an embodiment of this application.

FIG. 7A shows a working time sequence diagram of a positioning terminal when a time interval between receiving a first message and sending a positioning pulse by the positioning terminal is less than a preset time threshold. In the figure, a standby current needed when the positioning terminal is in a dormant state is determined as 1 uA, and the time interval between receiving the first message and sending the positioning pulse when the positioning terminal is in a wake-up time period is small. Therefore, the positioning terminal stays in an activated state.

Figure 7B:
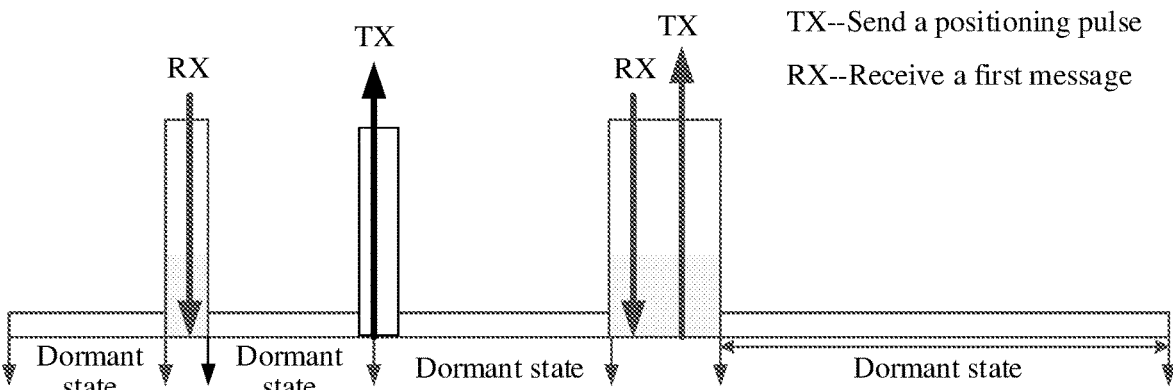
FIG. 7B is a working sequence diagram of a positioning terminal according to an embodiment of this application.

FIG. 7B shows a working time sequence diagram of a positioning terminal when a time interval between receiving a first message and sending a positioning pulse by the positioning terminal is greater than or equal to a preset time threshold. In the figure, a standby current needed when the positioning terminal is in a dormant state is determined as 1 uA, and the time interval between receiving the first message and sending the positioning pulse when the positioning terminal is in a wake-up time period is large. The positioning terminal first enters the dormant state after receiving the first message to reduce power consumption of the positioning terminal. The positioning terminal enters the dormant state again after sending the positioning pulse.

It should be noted that, when performing the positioning service, the positioning terminal switches between the four working states of the positioning terminal, to ensure that the positioning terminal is in a standby state for a long time. That the positioning terminal enters the dormant state after sending the positioning pulse can reduce a power consumption loss of the positioning terminal.

Figure 8A:
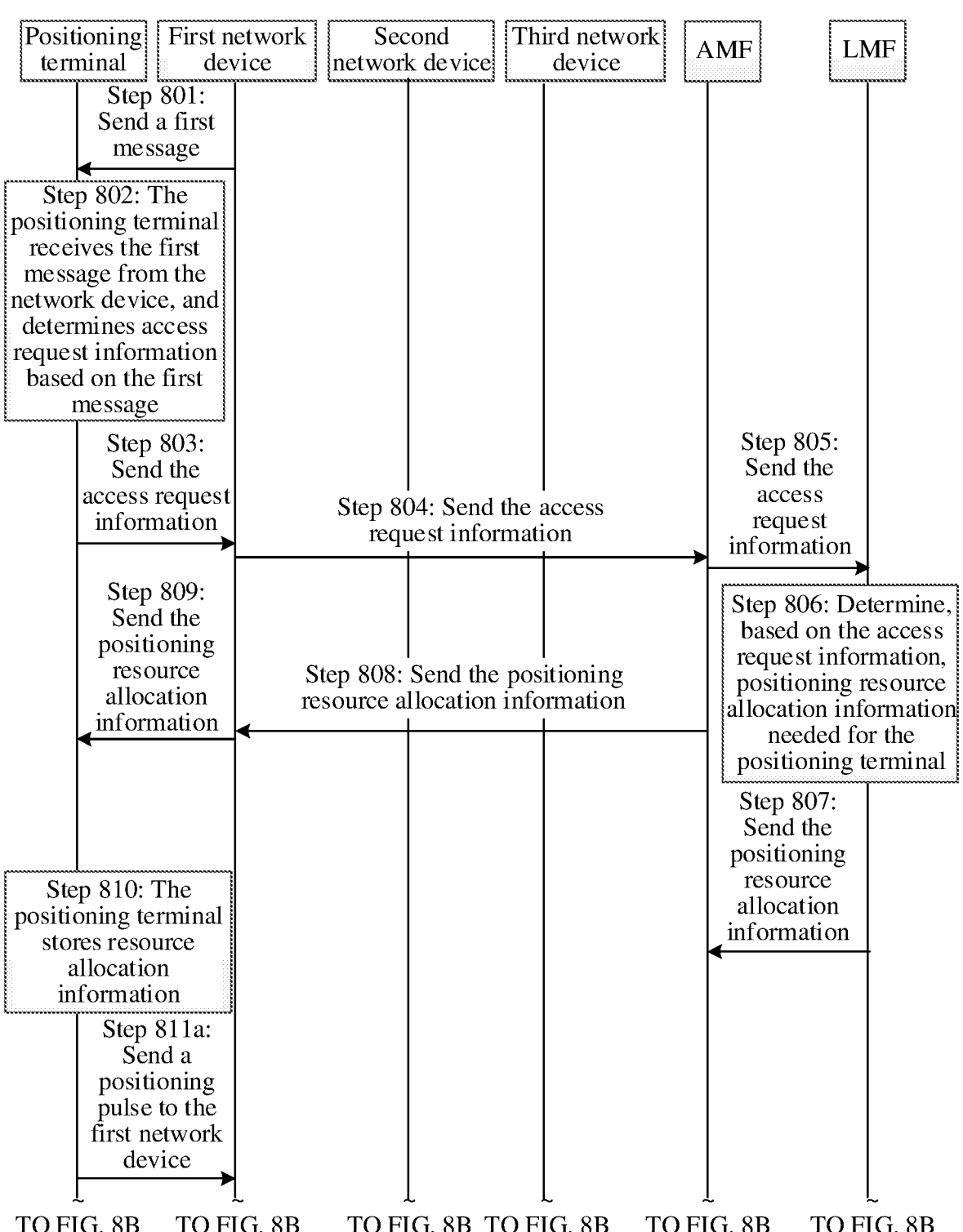
FIG. 8A and FIG. 8B is a schematic flowchart of a positioning method according to an embodiment of this application.
Figure 8B:
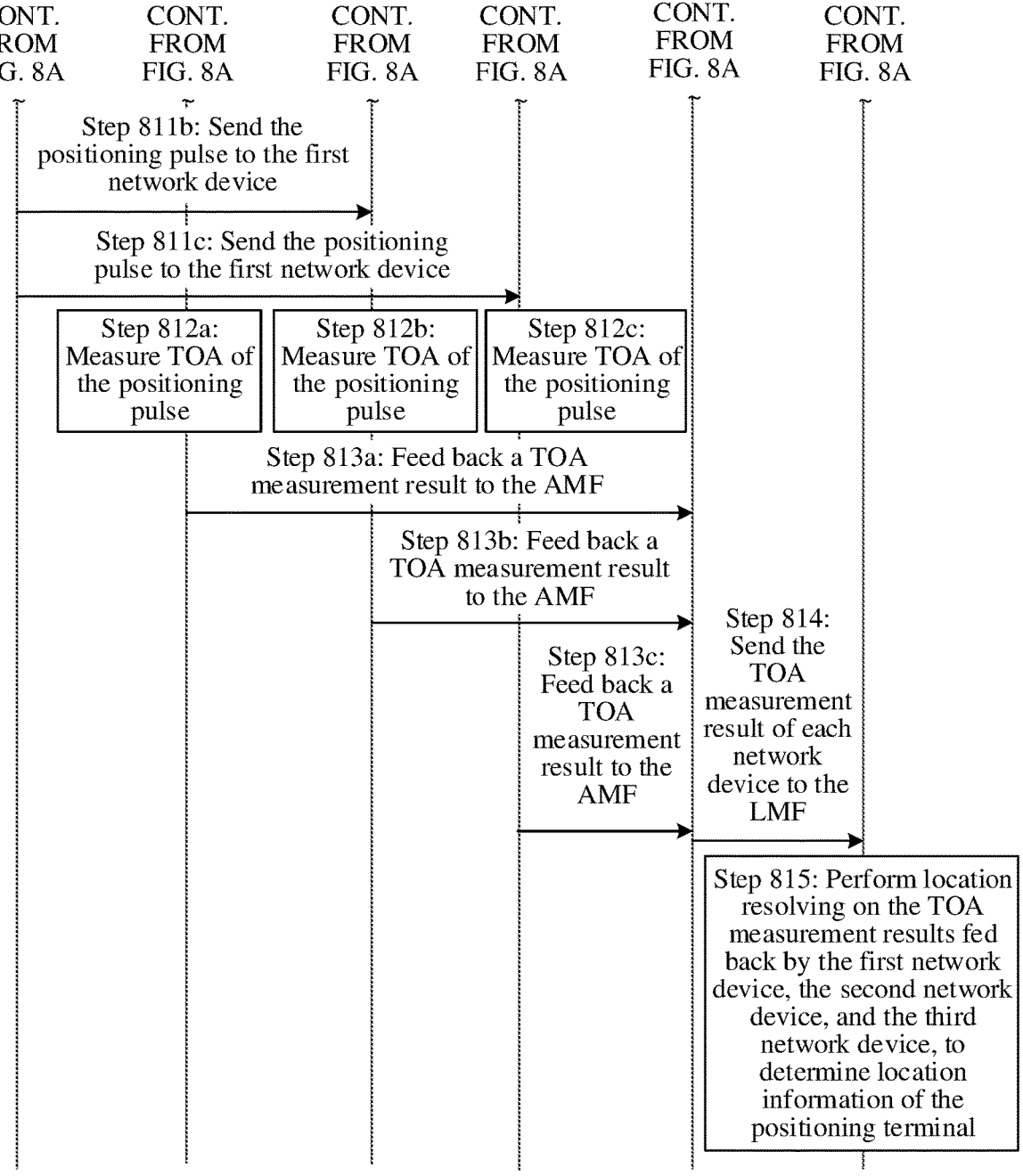

FIG. 8A and FIG. 8B is a schematic flowchart of a positioning method according to this application. FIG. 8A and FIG. 8B shows a positioning terminal, a first network device, a second network device, a third network device, and an LMF. During actual application, the network device needs to forward a message to the LMF via an AMF. Therefore, the AMF is further shown in the figure. In FIG. 8A and FIG. 8B, an example in which the first network device sends a first message to the positioning terminal is used for illustration. During actual application, a network device that sends the first message is not limited. In addition, in FIG. 8A and FIG. 8B, an example in which the positioning terminal sends a positioning pulse to the first network device, the second network device, and the third network device is used for illustration. However, during actual application, a network device to which the positioning terminal sends the positioning pulse is not limited, provided that the network device is located in a range of a neighborhood of the positioning terminal, in other words, the network device can receive a signal sent by the positioning terminal.

Step 801: The first network device sends a first message to the positioning terminal.

Step 802: The positioning terminal receives the first message from the first network device, and determines access request information based on the first message.

Step 803: The positioning terminal sends the access request information to the first network device.

Step 804: The first network device forwards the access request information to the AMF.

Step 805: The AMF forwards the access request information to the LMF.

Step 806: The LMF determines, based on the access request information, positioning resource allocation information needed for the positioning terminal.

Step 807: The LMF sends the positioning resource allocation information to the AMF.

Step 808: The AMF forwards the positioning resource allocation information to the first network device.

Step 809: The first network device forwards the positioning resource allocation information to the positioning terminal.

Step 810: The positioning terminal stores resource allocation information, and determines a positioning pulse based on the positioning resource allocation information.

Step 811*a*: The positioning terminal sends the positioning pulse to the first network device.

Step 811*b*: The positioning terminal sends the positioning pulse to the second network device.

Step 811*c*: The positioning terminal sends the positioning pulse to the third network device.

Step 812*a*: The first network device measures TOA of the positioning pulse.

Step 812*b*: The second network device measures TOA of the positioning pulse.

Step 812*c*: The third network device measures TOA of the positioning pulse.

Step 813*a*: The first network device feeds back a TOA measurement result to the AMF.

Step 813*b*: The second network device feeds back a TOA measurement result to the AMF.

Step 813*c*: The third network device feeds back a TOA measurement result to the AMF.

Step 814: The AMF feeds back the TOA measurement result of each network device to the LMF.

Step 815: The LMF performs location solving on the TOA measurement results fed back by the first network device, the second network device, and the third network device, to determine location information of the positioning terminal.

It should be noted that, in the positioning method provided in this application, before performing a positioning service, the positioning terminal only needs to obtain the first message and the positioning resource allocation information, and does not need to establish an RRC connection or wait for SRS resource allocation. Compared with UTDOA, this significantly reduces a quantity of times for exchanging information. When the quantity of times for exchanging information of the positioning terminal is reduced, working duration of the positioning terminal is short. Therefore, a power consumption loss of the positioning terminal is reduced.

In addition, the positioning pulse of the positioning terminal is periodically sent, and the positioning terminal enters a dormant state after the positioning pulse is sent. This can further reduce a power consumption loss of the terminal device. In addition, when the positioning solution in this application is performed, in addition to sending the positioning pulse to the network device, the positioning terminal may further report battery level information of the positioning terminal, data information of a barometric pressure sensor of the positioning terminal, and the like. After obtaining the battery level information of the positioning terminal, the LMF may accurately determine a power consumption status of the positioning terminal. For example, the battery level information of the positioning terminal indicates that a battery level of the positioning terminal is low. In this case, the LMF notifies a related personnel to replace a battery of the positioning terminal in time. After obtaining the data information of the barometric pressure sensor sent by the positioning terminal, the LMF may determine height information of the positioning terminal. For example, the LMF may determine floor information of the positioning terminal based on the data information of the barometric pressure sensor.

FIG. 9 is a schematic diagram of comparison between a UTDOA positioning method and a positioning method according to this application. When the positioning method is performed based on UTDOA, a terminal receives a system message (including a plurality of messages such as a MIB and a SIB), and then the terminal initiates random access to establish an RRC connection. After establishing the RRC connection, the terminal waits for an SRS resource, and periodically sends an SRS to a network device. The network device obtains TOA for receiving the SRS, and feeds back a TOA measurement result to an LMF, so that the LMF determines location information of the terminal based on the TOA measurement result. When the positioning method in this application is performed, a positioning terminal accesses a network after receiving a first message, and determines positioning resource allocation information. Then, the positioning terminal periodically sends a positioning pulse to a network device. The network device obtains TOA for receiving the positioning pulse, and feeds back a TOA measurement result to an LMF. The LMF determines location information of the terminal based on the TOA measurement result. It may be learned from FIG. 9 that, compared with a UTDOA positioning procedure, the positioning method in this application is simpler, and processes such as RRC connection establishment, SRS resource allocation, and measurement request are omitted. In addition, a quantity of times for exchanging information in the positioning method in this application is less.

In addition, the positioning terminal in this application is periodically and actively woken up, and the positioning terminal is in a dormant state for a long time. A power consumption loss of the positioning terminal is low. Table 1 shows comparison between power consumption of the positioning terminal in the positioning method in this application and power consumption of the terminal in the UTDOA positioning method.

TABLE 1

| Index | Solution of the UTDOA | Solution of the present invention | Description |
|---|---|---|---|
| Battery capacity | 640 mAh | 640 mAh | Same battery capacity |
| Transmitting power consumption per time | 85 mA * 90 μs | 85 mA * 90 μs | Transmitting power consumption: 85 mA; and duration: 90 μs |
| Receiving power consumption per time | 45 mA * 1 ms | 45 mA * 1 ms | Receiving power consumption: 45 mA; and duration: 1 ms |
| Wake-up power consumption per time | 10 mA * 300 ms | 10 mA * 20 ms | Wake-up power consumption: 10 mA; duration of the solution in this application: 20 ms; and duration of the UTDOA: 300 ms |
| Positioning times per day | 17280 | 17280 | For example, positioning performed every 5 seconds |
| Idle (idle state) power consumption per day | 3 mA * 24 h | — | Power consumption in the idle state: 3 mA |
| Dormant power consumption per day | — | 1 uA * 24 h | Power consumption in the dormant state: 1 uA |
| Working time (day) | 7 | 517 | |

It may be learned from Table 1 that, when battery capacities are the same, the positioning terminal can work for 517 days by using the positioning method in this application, and a requirement that the positioning terminal serves for more than one year can be met. However, in the solution of the UTDOA, the terminal intelligently works for seven days. Therefore, the positioning method provided in this application is more conducive to reducing power consumption of the positioning terminal.

Figure 10:
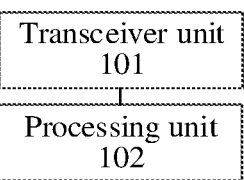
FIG. 10 is a schematic diagram of a structure of a communication apparatus according to an embodiment of this application.

Based on a same conception, as shown in FIG. 10, an embodiment of this application provides a communication apparatus, including a transceiver unit 101 and a processing unit 102. The transceiver unit 101 is configured to: receive a first message from a network device, where the first message includes clock synchronization information and access network resource allocation information; send access request information to the network device based on the first message; and receive positioning resource allocation information from the network device, where the positioning resource allocation information is determined after the network device receives the access request information sent by a positioning terminal and sends the access request information to an LMF. The processing unit 102 is configured to: determine a positioning pulse based on the positioning resource allocation information; and send the positioning pulse to a network device in a range of a neighborhood of the positioning terminal, where there are three or more network devices in the range of the neighborhood of the positioning terminal.

In an optional implementation, the first message further includes session reconfiguration flag information, and the session reconfiguration flag information is used to resend the access request information when the positioning resource allocation information changes.

In an optional implementation, the access network resource allocation information includes: an access location number, an access periodicity, and an access location interval periodicity. The access location number indicates a symbol resource used by the positioning terminal to access a network. The access periodicity indicates interval time needed for the positioning terminal to reaccess the network after the positioning terminal fails to access the network. The access location interval periodicity indicates an interval periodicity in which the positioning terminal performs access at different access location numbers.

In an optional implementation, the positioning resource allocation information carries a positioning symbol resource allocated by the LMF to the positioning terminal, and the positioning symbol resource includes a positioning symbol location number and a positioning pulse sending periodicity. The positioning symbol location number indicates a resource location at which the positioning terminal sends the positioning pulse. The positioning pulse sending periodicity indicates a periodicity in which the positioning terminal sends the positioning pulse.

In an optional implementation, the processing unit 101 is further configured to send the positioning pulse based on the positioning pulse sending periodicity.

In an optional implementation, the processing unit 101 is further configured to: determine a time interval between receiving the first message and send the positioning pulse. If the time interval is greater than a preset time threshold, the positioning terminal enters a dormant state. If the time interval is less than or equal to a preset time threshold, the positioning terminal sends the positioning pulse.

In an optional implementation, the positioning terminal needs to re-receive the positioning resource allocation information in the following cases: The positioning terminal initially accesses the network; and the positioning terminal moves to a management area of an LMF other than a management area of the LMF.

Figure 11:
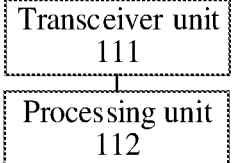
FIG. 11 is a schematic diagram of a structure of a communication apparatus according to an embodiment of this application.

As shown in FIG. 11, an embodiment of this application provides a communication apparatus, including a transceiver unit 111 and a processing unit 112. The transceiver unit 111 is configured to receive access request information from a network device. The access request information is sent by a positioning terminal after the positioning terminal receives a first message from the network device. The first message includes clock synchronization information and access network resource allocation information. The processing unit 112 is configured to: determine, based on the access request information, positioning resource allocation information needed for the positioning terminal; send the positioning resource allocation information to the network device, to enable the network device to send the positioning resource allocation information to the positioning terminal, so that after the positioning terminal determines a positioning pulse based on the positioning resource allocation information, the positioning terminal sends the positioning pulse to a network device in a range of a neighborhood of the positioning terminal, where there are three or more network devices in the range of the neighborhood of the positioning terminal; receive time of arrival TOA sent by the network device in the range of the neighborhood of the positioning terminal, where the TOA is determined after the network device in the range of the neighborhood of the positioning terminal receives the positioning pulse; and determine location information of the positioning terminal based on the TOA.

In an optional implementation, the positioning resource allocation information carries a positioning symbol resource allocated by the LMF to the positioning terminal, and the positioning symbol resource includes a positioning symbol location number and a positioning pulse sending periodicity. The positioning symbol location number indicates a resource location at which the positioning terminal sends the positioning pulse. The positioning pulse sending periodicity indicates a periodicity in which the positioning terminal sends the positioning pulse.

In an optional implementation, the processing unit 112 is further configured to set the positioning symbol resource to be in an allocated state.

In an optional implementation, the processing unit 112 is further configured to: start a timer; and if the TOA sent by the network device in the range of the neighborhood of the positioning terminal is not received when the timer expires, release the positioning symbol resource.

In an optional implementation, the first message further includes session reconfiguration flag information, and the session reconfiguration flag information is used to resend the access request information when the positioning resource allocation information changes.

In an optional implementation, the access network resource allocation information includes: an access location number, an access periodicity, and an access location interval periodicity. The access location number indicates a symbol resource used by the positioning terminal to access a network. The access periodicity indicates interval time needed for the positioning terminal to reaccess the network after the positioning terminal fails to access the network. The access location interval periodicity indicates an interval periodicity in which the positioning terminal performs access at different access location numbers.

Figure 12:
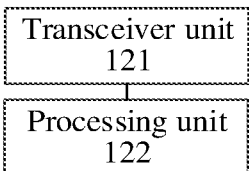
FIG. 12 is a schematic diagram of a structure of a communication apparatus according to an embodiment of this application.

As shown in FIG. 12, an embodiment of this application provides a communication apparatus, including a transceiver unit 121 and a processing unit 122. The transceiver unit 121 is configured to send a first message to a positioning terminal, where the first message includes clock synchronization information and access network resource allocation information; and receive access request information sent by the positioning terminal after the positioning terminal receives the first message. The processing unit 122 is configured to: send the access request information to a location management function LMF, to enable the LMF to feed back positioning resource allocation information; and send the positioning resource allocation information to the positioning terminal, to enable the positioning terminal to determine a positioning pulse based on the positioning resource allocation information.

In an optional implementation, the first message further includes session reconfiguration flag information, and the session reconfiguration flag information is used to resend the access request information when the positioning resource allocation information changes.

In an optional implementation, the access network resource allocation information includes: an access location number, an access periodicity, and an access location interval periodicity. The access location number indicates a symbol resource used by the positioning terminal to access a network. The access periodicity indicates interval time needed for the positioning terminal to reaccess the network after the positioning terminal fails to access the network. The access location interval periodicity indicates an interval periodicity in which the positioning terminal performs access at different access location numbers.

In an optional implementation, the positioning resource allocation information carries a positioning symbol resource allocated by the LMF to the positioning terminal, and the positioning symbol resource includes a positioning symbol location number and a positioning pulse sending periodicity. The positioning symbol location number indicates a resource location at which the positioning terminal sends the positioning pulse. The positioning pulse sending periodicity indicates a periodicity in which the positioning terminal sends the positioning pulse.

Figure 13:
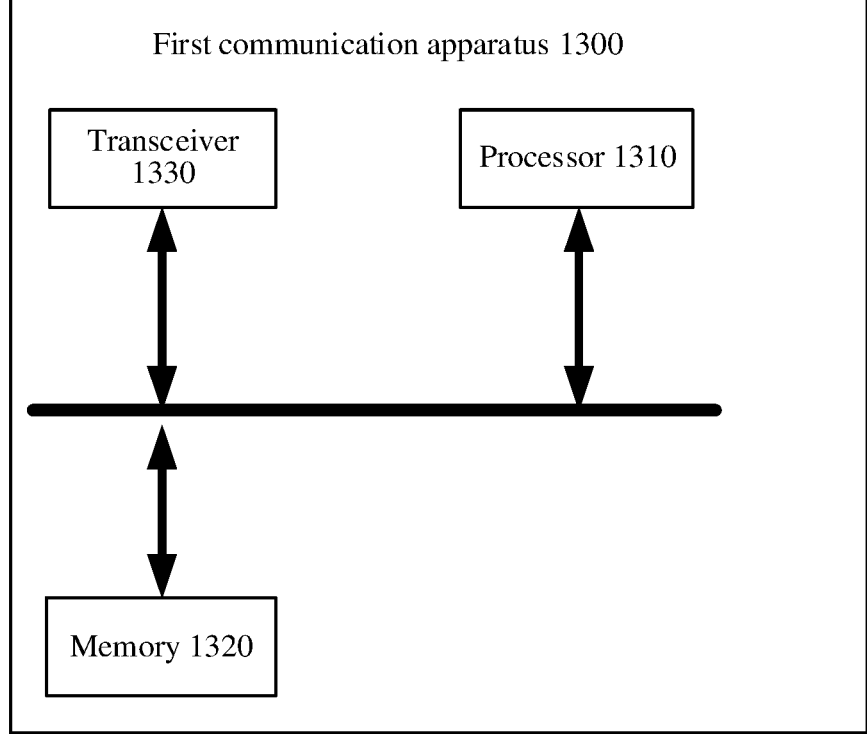
FIG. 13 is a schematic diagram of a structure of a communication apparatus according to an embodiment of this application.

Based on the same conception, FIG. 13 shows a communication apparatus 1300 according to this application. For example, the communication apparatus 1300 may be a chip or a chip system. Optionally, in this embodiment of this application, the chip system may include a chip, or may include a chip and another discrete device.

The communication apparatus 1300 may include at least one processor 1310. The communication apparatus 1300 may further include at least one memory 1320, configured to store a computer program, program instructions, and/or data. The memory 1320 is coupled to the processor 1310. The coupling in embodiments of this application may be an indirect coupling or a communication connection between apparatuses, units, or modules in an electrical form, a mechanical form, or another form, and is used for exchanging information between the apparatuses, the units, or the modules. The processor 1310 may operate with the memory 1320. The processor 1310 may execute the computer program stored in the memory 1320. Optionally, the at least one memory 1320 may be integrated into the processor 1310.

The communication apparatus 1300 may further include a transceiver 1330, and the communication apparatus 1300 may exchange information with another device via the transceiver 1330. The transceiver 1330 may be a circuit, a bus, a transceiver, or any other apparatus that may be configured to exchange information.

In a possible implementation, the communication apparatus 1300 may be used in the foregoing positioning terminal, may be the foregoing network device, or may be the foregoing LMF. The memory 1320 stores a necessary computer program, program instructions, and/or data for implementing the function of the network device according to any one of the foregoing embodiments. The processor 1310 may execute the computer program stored in the memory 1320, to complete the method according to any one of the foregoing embodiments.

In this embodiment of this application, a specific connection medium among the transceiver 1330, the processor 1310, and the memory 1320 is not limited. In this embodiment of this application, the memory 1320, the processor 1310, and the transceiver 1330 are connected via a bus in FIG. 13. The bus is represented by using a bold line in FIG. 13. A manner of connection between other components is merely an example for description, and imposes no limitation. The bus may be classified into an address bus, a data bus, a control bus, and the like. For ease of representation, only one bold line is used to represent the bus in FIG. 13, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a nonvolatile memory, for example, a hard disk drive (HDD) or a solid-state drive (SSD), or may be a volatile memory such as a random access memory (RAM). The memory may alternatively be any other medium that can be configured to carry or store expected program code in a form of an instruction or a data structure and that can be accessed by a computer. This is not limited thereto. The memory in embodiments of this application may alternatively be a circuit or any other apparatus that can implement a storage function, and is configured to store the computer program, the program instructions, and/or the data.

Based on the foregoing embodiments, an embodiment of this application further provides a readable storage medium. The readable storage medium stores instructions; and when the instructions are executed, the method performed by the security detection device in any one of the foregoing embodiments is implemented. The readable storage medium may include any medium that can store program code such as a USB flash drive, a removable hard disk, a read-only memory, a random access memory, a magnetic disk, or an optical disc.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used for implementing each procedure and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of any other programmable data processing device to generate a machine, so that the instructions executed by the computer or the processor of any other programmable data processing device generate an apparatus for implementing a specific function in one or more procedures in the flowcharts and/or in one or more blocks in the block diagrams.

The computer program instructions may alternatively be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, applied to a positioning terminal, comprising:
   receiving a first message from a network device, wherein the first message comprises clock synchronization information and access network resource allocation information;
   sending access request information to the network device based on the first message;
   receiving positioning resource allocation information from the network device, wherein the positioning resource allocation information is determined after the network device receives the access request information sent by the positioning terminal and sends the access request information to a location management function (LMF);
   determining a positioning pulse based on the positioning resource allocation information; and
   sending the positioning pulse to one of three or more network devices in a range of a neighborhood of the positioning terminal;
   wherein the positioning resource allocation information carries a positioning symbol resource allocated by the LMF to the positioning terminal, and the positioning symbol resource comprises a positioning symbol location number and a positioning pulse sending periodicity;
   wherein the positioning symbol location number indicates a resource location at which the positioning terminal sends the positioning pulse; and
   wherein the positioning pulse sending periodicity indicates a periodicity in which the positioning terminal sends the positioning pulse.

2. The method according to claim 1, wherein the first message further comprises session reconfiguration flag information; and
   the session reconfiguration flag information is used to resend the access request information in response to determining that the positioning resource allocation information changes.

3. The method according to claim 1, wherein the access network resource allocation information comprises an access location number, an access periodicity, and an access location interval periodicity;

the access location number indicates a symbol resource used by the positioning terminal to access a network;

the access periodicity indicates interval time needed for the positioning terminal to reaccess the network after the positioning terminal fails to access the network; and the access location interval periodicity indicates an interval periodicity in which the positioning terminal performs access at different access location numbers.

4. The method according to claim 1, wherein after the determining a positioning pulse based on the positioning resource allocation information, the method further comprises:

starting a timer; and sending the positioning pulse based on the positioning pulse sending periodicity.

5. The method according to claim 1, further comprising:

determining a time interval between receiving the first message and sending the positioning pulse; and in response to determining that the time interval is greater than a preset time threshold, entering, by the positioning terminal, a dormant state; or in response to determining that the time interval is less than or equal to a preset time threshold, sending, by the positioning terminal, the positioning pulse.

6. The method according to claim 1, wherein the positioning terminal re-receives the positioning resource allocation information in at least one of the following cases:

the positioning terminal initially accesses a network; and the positioning terminal moves to a management area of another LMF.

7. A method, applied to a location management function (LMF), comprising:

receiving access request information from a network device, wherein the access request information is sent by a positioning terminal after the positioning terminal receives a first message from the network device, and the first message comprises clock synchronization information and access network resource allocation information;

determining, based on the access request information, positioning resource allocation information needed for the positioning terminal;

sending the positioning resource allocation information to the network device, to enable the network device to send the positioning resource allocation information to the positioning terminal, so that after the positioning terminal determines a positioning pulse based on the positioning resource allocation information, the positioning terminal sends the positioning pulse to one of three or more network devices in a range of a neighborhood of the positioning terminal;

receiving time of arrival (TOA) sent by the network device in the range of the neighborhood of the positioning terminal, wherein the TOA is determined after the network device in the range of the neighborhood of the positioning terminal receives the positioning pulse; and determining location information of the positioning terminal based on the TOA;

wherein the positioning resource allocation information carries a positioning symbol resource allocated by the LMF to the positioning terminal, and the positioning symbol resource comprises a positioning symbol location number and a positioning pulse sending periodicity;

wherein the positioning symbol location number indicates a resource location at which the positioning terminal sends the positioning pulse; and wherein the positioning pulse sending periodicity indicates a periodicity in which the positioning terminal sends the positioning pulse.

8. The method according to claim 7, wherein after the sending the positioning resource allocation information to the network device, the method further comprises:

setting the positioning symbol resource to be in an allocated state.

9. The method according to claim 7, further comprising:

starting a timer; and in response to determining that the TOA sent by the network device in the range of the neighborhood of the positioning terminal is not received when the timer expires, releasing the positioning symbol resource.

10. The method according to claim 7, wherein the first message further comprises session reconfiguration flag information; and the session reconfiguration flag information is used to resend the access request information in response to that the positioning resource allocation information changes.

11. The method according to claim 7, wherein the access network resource allocation information comprises an access location number, an access periodicity, and an access location interval periodicity;

the access location number indicates a symbol resource used by the positioning terminal to access a network;

the access periodicity indicates interval time needed for the positioning terminal to reaccess the network after the positioning terminal fails to access the network; and the access location interval periodicity indicates an interval periodicity in which the positioning terminal performs access at different access location numbers.

12. An apparatus, comprising a transceiver, at least one processor, and at least one memory coupled to the at least one processor, wherein the at least one memory stores programming instructions for execution by the at least one processor to cause the apparatus to perform operations comprising:

receiving a first message from a network device, wherein the first message comprises clock synchronization information and access network resource allocation information;

sending access request information to the network device based on the first message;

receiving positioning resource allocation information from the network device, wherein the positioning resource allocation information is determined after the network device receives the access request information sent by a positioning terminal and sends the access request information to a location management function (LMF);

determining a positioning pulse based on the positioning resource allocation information; and sending the positioning pulse to one of three or more network devices in a range of a neighborhood of the positioning terminal;

wherein the positioning resource allocation information carries a positioning symbol resource allocated by the LMF to the positioning terminal, and the positioning symbol resource comprises a positioning symbol location number and a positioning pulse sending periodicity;

the positioning symbol location number indicates a resource location at which the positioning terminal sends the positioning pulse; and the positioning pulse sending periodicity indicates a periodicity in which the positioning terminal sends the positioning pulse.

13. The apparatus according to claim 12, wherein the first message further comprises session reconfiguration flag information; and the session reconfiguration flag information is used to resend the access request information in response to determining that the positioning resource allocation information changes.

14. The apparatus according to claim 12, wherein the access network resource allocation information comprises an access location number, an access periodicity, and an access location interval periodicity;

the access location number indicates a symbol resource used by the positioning terminal to access a network;

the access periodicity indicates interval time needed for the positioning terminal to reaccess the network after the positioning terminal fails to access the network; and the access location interval periodicity indicates an interval periodicity in which the positioning terminal performs access at different access location numbers.

15. The apparatus according to claim 12, wherein the operations further comprise:

sending the positioning pulse based on the positioning pulse sending periodicity.

16. The apparatus according to claim 12, wherein the operations further comprise:

determining a time interval between receiving the first message and sending the positioning pulse, wherein in response to determining that the time interval is greater than a preset time threshold, the positioning terminal enters a dormant state; or in response to determining that the time interval is less than or equal to a preset time threshold, the positioning terminal sends the positioning pulse.

17. The apparatus according to claim 12, wherein the positioning terminal re-receives the positioning resource allocation information in at least one of the following cases:

the positioning terminal initially accesses a network; and the positioning terminal moves to a management area of another LMF.

* * * * *